(12) United States Patent
Perez et al.

(10) Patent No.: US 7,088,870 B2
(45) Date of Patent: Aug. 8, 2006

(54) IMAGE REGION FILLING BY EXAMPLE-BASED TILING

(75) Inventors: Patrick Perez, Cambridge (GB); Michel Gangnet, Cambridge (GB); Andrew Blake, Stapleford (GB)

(73) Assignee: Microsoft Corporation, Redmond, WA (US)

( * ) Notice: Subject to any disclaimer, the term of this patent is extended or adjusted under 35 U.S.C. 154(b) by 237 days.

(21) Appl. No.: 10/373,635

(22) Filed: Feb. 24, 2003

(65) Prior Publication Data

US 2004/0165787 A1    Aug. 26, 2004

(51) Int. Cl.
*G06K 9/36* (2006.01)
(52) U.S. Cl. .................. 382/284; 345/629; 348/586
(58) Field of Classification Search .............. 382/284, 382/256, 257, 258, 269, 275; 345/629–641; 348/584–601
See application file for complete search history.

(56) References Cited

U.S. PATENT DOCUMENTS

| | | | |
|---|---|---|---|
| 5,420,966 A | 5/1995 | Silverbrook | |
| 5,596,693 A * | 1/1997 | Needle et al. | 345/474 |
| 5,870,100 A | 2/1999 | DeFreitas | |
| 5,872,867 A * | 2/1999 | Bergen | 382/254 |
| 6,483,519 B1 | 11/2002 | Long et al. | |
| 6,593,933 B1* | 7/2003 | Xu et al. | 345/586 |
| 6,762,769 B1* | 7/2004 | Guo et al. | 345/582 |
| 2002/0131495 A1 | 9/2002 | Prakash et al. | |
| 2002/0136453 A1 | 9/2002 | Aggarwal et al. | |
| 2003/0210828 A1 | 11/2003 | Georgiev et al. | |
| 2004/0155881 A1 | 8/2004 | Kotani et al. | |

OTHER PUBLICATIONS

Bertalmio, Marcelo; Sapiro Guillermo; Caselles Vicent; Ballester, Coloma; Image Inpainting; Computer Graphics (SIG-Graph 2000); Jul. i000, pp. 417-424.*

Bertalimio, M; Bertozzi, A; Sapiro, G; Three Examples of Inpainting Using the Navier-Stokes Based Method; www.math.duke.edu/~bertozzi/inpaint.inpaint/html; CVPR 2001; 3 pages.

Ballester, C.; Caselles, V; Verdera J.; Bertalmio, M; Sapiro, G.; A Variational Model for Filling-in Gray Level and Color Images; IEEE; 2001; 7 pages.

Bertalmio, Marcelo; Sapiro, Guillermo; Caselles, Vicent; Ballester, Coloma; Image Inpainting; Computer Graphics (SIG-Graph 2000); Jul. 2000; pp. 417-424.

Bertalmio, Marcelo; Vese, Luminita; Sapiro, Guillermo; Osher, Stanley; Simultaneous Structure and Texture Image Inpainting; www-mount.ee.umn.edu/~guille/inpainting.htm; Jul. 2002; 13 pages.

(Continued)

*Primary Examiner*—Samir Ahmed
*Assistant Examiner*—Anand Bhatnagar
(74) *Attorney, Agent, or Firm*—Microsoft Corporation

(57) ABSTRACT

An example-based filling system identifies appropriate filling material to replace a destination region in an image and fills the destination region using this material, thereby alleviating or minimizing the amount of manual editing required to fill a destination region in image. Tiles of image data are borrowed from the proximity of the destination region or some other source to generate new image data to fill in the region. Destination regions may be designated by user input (e.g., selection of an image region by a user) or by other means (e.g., specification of a color or feature to be replaced).

35 Claims, 17 Drawing Sheets

OTHER PUBLICATIONS

Rane Shantanu D.; Sapiro, Guillermo; Bertalmio, Marcelo; Structure and Texture Filling-in of Missing Image Blocks in Wireless Transmission and Compression Applications; Accepted IEEE Trans. Image Processing, 2002; 17 pages.

Bertalmio, Marcelo; Bertozzi, A. L.; Sapiro, Guillermo; Navier-Stokes, Fluid Dynamics and Image and Video Inpainting; Proc. Conf. Comp. Vision Pattern Re.; Dec. 2001; I:355-362; Hawaii.

Rane, Santanu D.; Remus, Jeremiah; Sapiro, Guillermo; Wavelet-Domain Reconstruction of Lost Blocks in Wireless Image Transmission and Packet-Switched Networks; ICIP 2002 Poster, Rochester, NY; 4 pages.

Wei, Li-Yi; Levoy, Marc; Fast Texture Synthesis using Tree-structured Vector Quantization; graphics.stanford.edu/papers/texture-synthesis-sig00/; In Proceedings of SIGGRAPH 2000; Stanford, CA; 10 pages.

Verdera, Joan; Caselles, Vincent; Bertalmio, Marcelo; Sapiro, Guillermo; Inpainting Surface Holes; www-mount.ee.umn.edu/~guille/surface_holes.pdf; 4 pages.

Alexi A. Efros and Thomas K. Leung, Texture Synthesis by Non-parametric Sampling, IEEE International Conference on Computer Vision, Corfu, Greece Sep. 1999.

Ying-Qing Xu; Baining Guo; Harry Shum; Chaos Mosaic: Fast and Memory Efficient Texture Synthesis, Apr. 20, 2000; Microsoft Research, Microsoft Corporation, One Microsoft Way, Redmond, WA 98052.

* cited by examiner

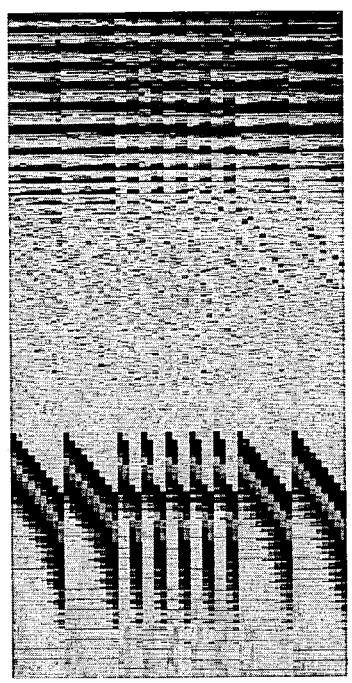
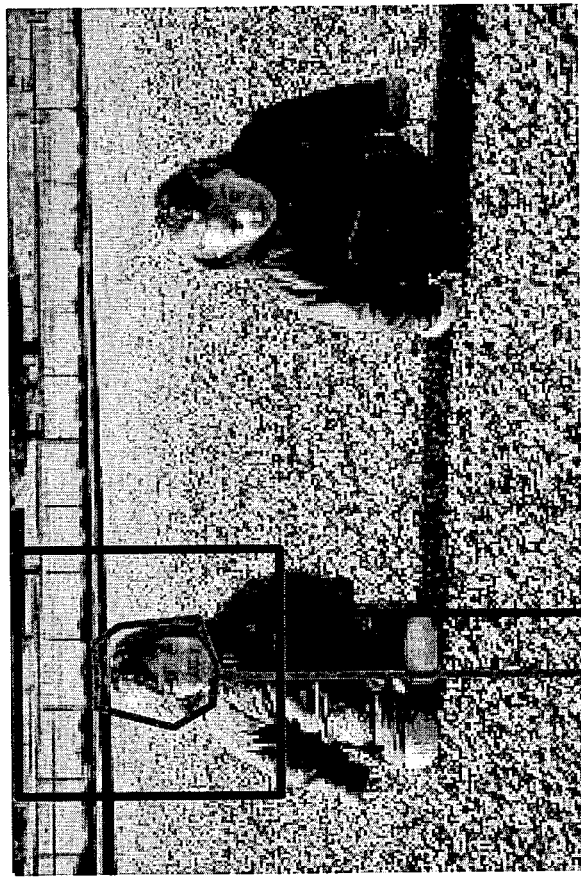
FIG. 10

IMAGE REGION FILLING BY EXAMPLE-BASED TILING

TECHNICAL FIELD

The invention relates generally to image editing, and more particularly to filling regions in an image.

BACKGROUND OF THE INVENTION

Editing digital images, particularly digital photographs, is a common activity in both domestic and professional contexts. Common tasks include repairing (e.g., hiding tears, scratches, stains, and other damage), correcting (e.g., removing red eyes and other undesirable features in the image), and modifying (e.g., removing features of the image to change its semantics) a digital image.

In many such activities, the task may be accomplished by "filling" a region in the image with other image data. For example, in FIG. 1, a digital image 100 depicts a house with a satellite dish 102 on its roof. If a user wishes to remove the satellite dish 102 from the roof of the house in the image 100, the user may employ an existing approach called "cloning". In cloning, the user manually copies one or more portions of backgrounds 104 and 106 and pastes them over the satellite dish 102 in appropriate locations and orientations, so as to hide the satellite dish 102. More sophisticated users may supplement this approach by manually introducing some local feathering at the borders of the pasted regions to conceal the seams.

However, the cloning approach is often time-consuming and tedious, if not impractical, and typically produces poor results at least in the following cases:

1. the region to fill (the "destination region") is large, at least in one dimension (e.g., a whole person, a long scratch);
2. the area available in the rest of the image for potential background sources is small;
3. the regions to fill in are small but numerous (e.g., superimposed text); and
4. the region to fill in is surrounded by more than one type of texture, thereby requiring re-creation of inter-region boundaries.

Therefore, the existing cloning approach fails to satisfactorily fill destination regions in some images, is primarily manual, and is particularly ill-suited for many common scenarios.

SUMMARY OF THE INVENTION

Embodiments of the present invention solve the discussed problems by borrowing example tiles of image data from the proximity of the destination region or some other source to generate new image data for filling in the region. The example-based filling system identifies appropriate filling material to replace a destination region in an image and fills in the destination region using this material, thereby alleviating or minimizing the amount of manual editing required to fill a region in an image. Destination regions may be designated by user input (e.g., selection of an image region by a user) or by other means (e.g., specification of a color or feature to be replaced).

In implementations of the present invention, articles of manufacture are provided as computer program products. One embodiment of a computer program product provides a computer program storage medium readable by a computer system and encoding a computer program that fills a destination region in an image with one or more example tiles. Another embodiment of a computer program product may be provided in a computer data signal embodied in a carrier wave by a computing system and encoding the computer program that fills a destination region in an image with one or more example tiles.

The computer program product encodes a computer program for executing on a computer system a computer process for filling a destination region in an image with one or more example tiles. A destination tile within the destination region is selected. The destination tile is associated with a destination neighborhood including one or both of original image data from outside the destination region and filled-in image data. The destination tile in the image is replaced with a best matching example tile. The selecting and replacing operations are repeated until the destination region is filled.

Another embodiment of the present invention provides a computer program product that encodes a computer program for executing on a computer system a computer process for filling a destination region in an image with one or more example tiles. A destination tile is selected within the destination region. The destination tile is associated with a destination neighborhood containing at least one of original image data from outside the destination region and filled-in image data. A matching example tile is selected from a plurality of example tiles. Each example tile is associated with an example neighborhood. The matching example tile provides a best match between the example neighborhood of the matching example tile and the destination neighborhood of the destination tile. The destination tile in the image is replaced with the matching example tile.

In another implementation of the present invention, a method of filling a destination region in an image with one or more example tiles is provided. A destination tile within the destination region is selected. The destination tile is associated with a destination neighborhood including one or both of original image data from outside the destination region and filled-in image data. The destination tile in the image is replaced with a best matching example tile. The selecting and replacing operations are repeated until the destination region is filled.

Another embodiment of the present invention provides a method of filling a destination region in an image with one or more example tiles. The destination tile is associated with a destination neighborhood containing at least one of original image data from outside the destination region and filled-in image data. A matching example tile is selected from a plurality of example tiles. Each example tile is associated with an example neighborhood. The matching example tile provides a best match between the example neighborhood of the matching example tile and the destination neighborhood of the destination tile. The destination tile in the image is replaced with the matching example tile.

In yet another embodiment of the present invention, a system for filling a destination region in an image with one or more example tiles is provided. A destination tile processing module selects a destination tile within the destination region. The destination tile is associated with a destination neighborhood containing at least one of original image data from outside the destination region and filled-in image data. A matching module selects a matching example tile from a plurality of example tiles. Each example tile is associated with an example neighborhood. The matching example tile provides a best match between the example neighborhood of the matching example tile and the destination neighborhood of the destination tile. A filling module replaces the destination tile in the image with the matching example tile.

These and various other features as well as other advantages, which characterize the present invention, will be apparent from a reading of the following detailed description and a review of the associated drawings.

BRIEF DESCRIPTION OF THE DRAWINGS

FIG. 10 depicts a digital image and an associated dictionary in an embodiment of the present invention.

DETAILED DESCRIPTION OF THE INVENTION

The example-based filling described herein provides a powerful alternative to existing cloning-type techniques. The example-based filling system can identify appropriate filling material to replace a destination region in an image and fill the destination region using this material. This approach alleviates or minimizes the amount of manual editing previously required to fill a destination region in an image. Tiles of image data are borrowed from the proximity of the destination region or some other source to generate new image data to fill in the region. Destination regions may be designated by user input (e.g., selection of an image region by a user) or through other means (e.g., specification of a color or feature to be replaced).

Figure 1:
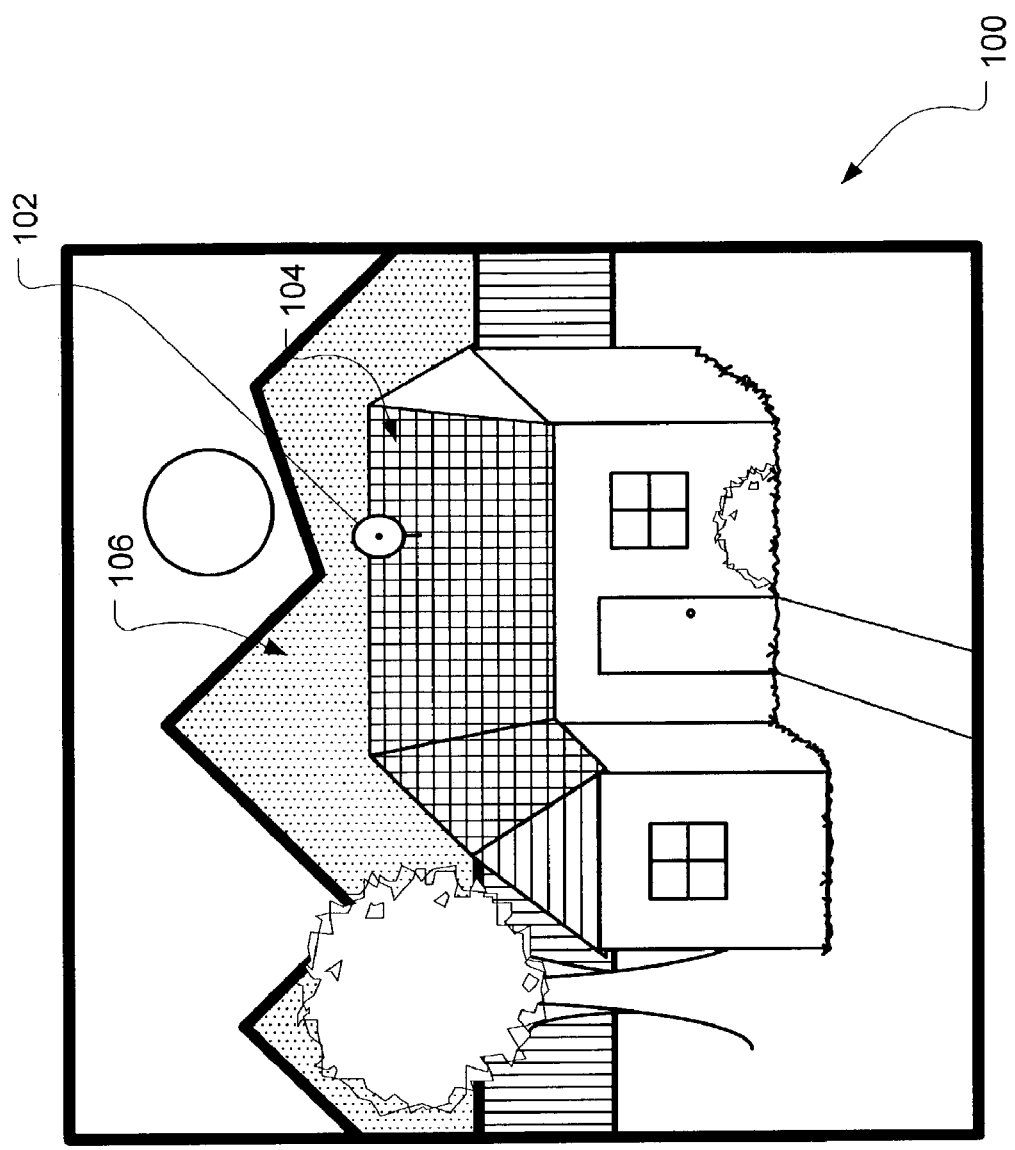
FIG. 1 illustrates an unedited image displayed in an embodiment of the present invention.

FIG. 1 illustrates an unedited image displayed in an embodiment of the present invention. The digital image 100 depicts the house with the satellite dish 102 on its roof. For the purpose of this description, a user wishes to delete the satellite dish from the image 100.

Generally, digital images are composed of pixels (short for "picture elements"). A pixel is the smallest logical unit of visual information that can be used to build a digital image. Pixels are the little light elements that can be seen when a graphics image is enlarged. The more pixels in an image, the better its resolution. Digital images are typically represented by intensity values for individual pixels in an array. For color images, for example, a color intensity value for each channel is associated with a given pixel.

Figure 2:
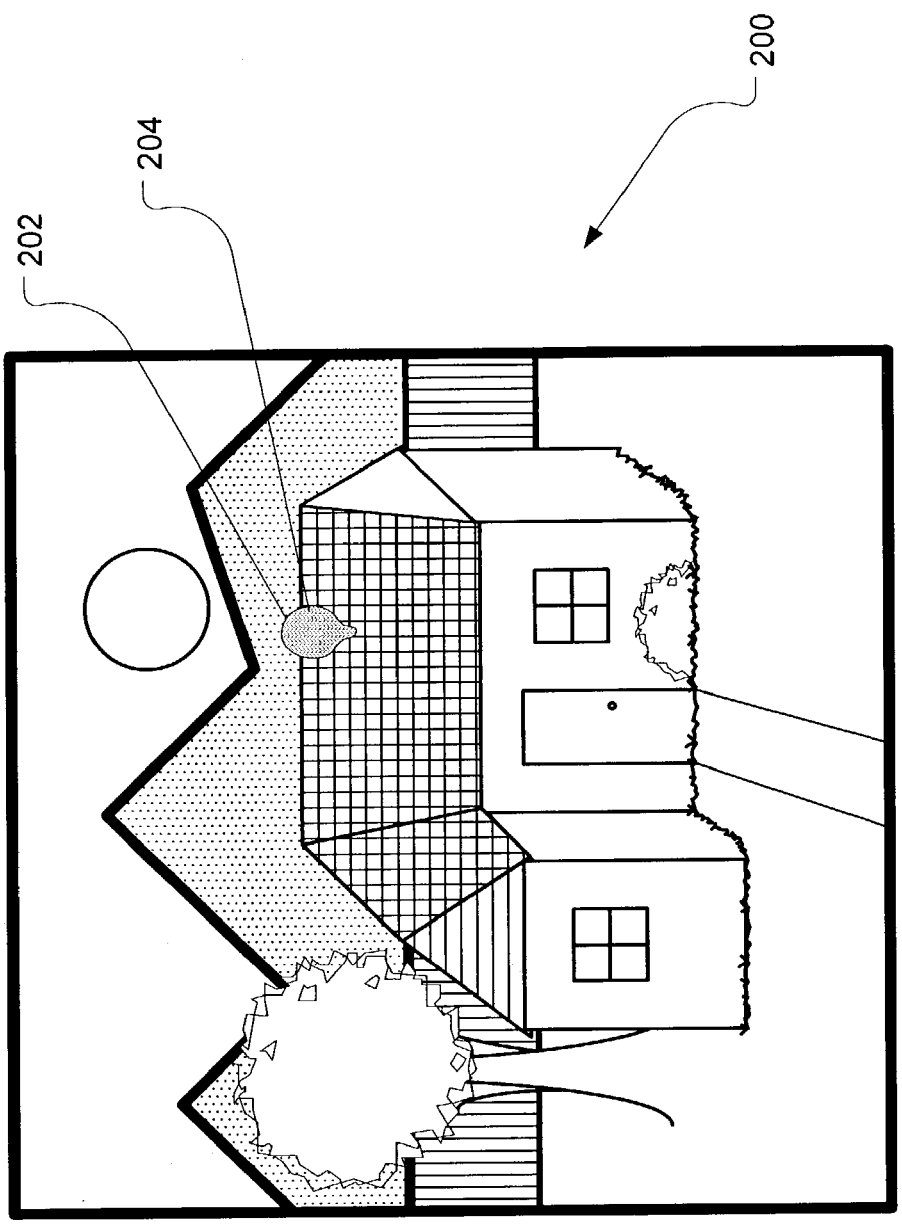
FIG. 2 illustrates a selected region in an image displayed in an embodiment of the present invention.

FIG. 2 illustrates a selected destination region in an image displayed in an embodiment of the present invention. The digital image 200 depicts the house with the satellite dish 202 on its roof. In an embodiment of the present invention, if the user wishes to remove the satellite dish 202 from the roof of the house, the user may select the region around the satellite dish 202, as shown by shaded region 204. A "delete-and-fill" command is executed to remove the satellite dish 202 from the image and to fill in the destination region designated by the shaded region 204.

Figure 3:
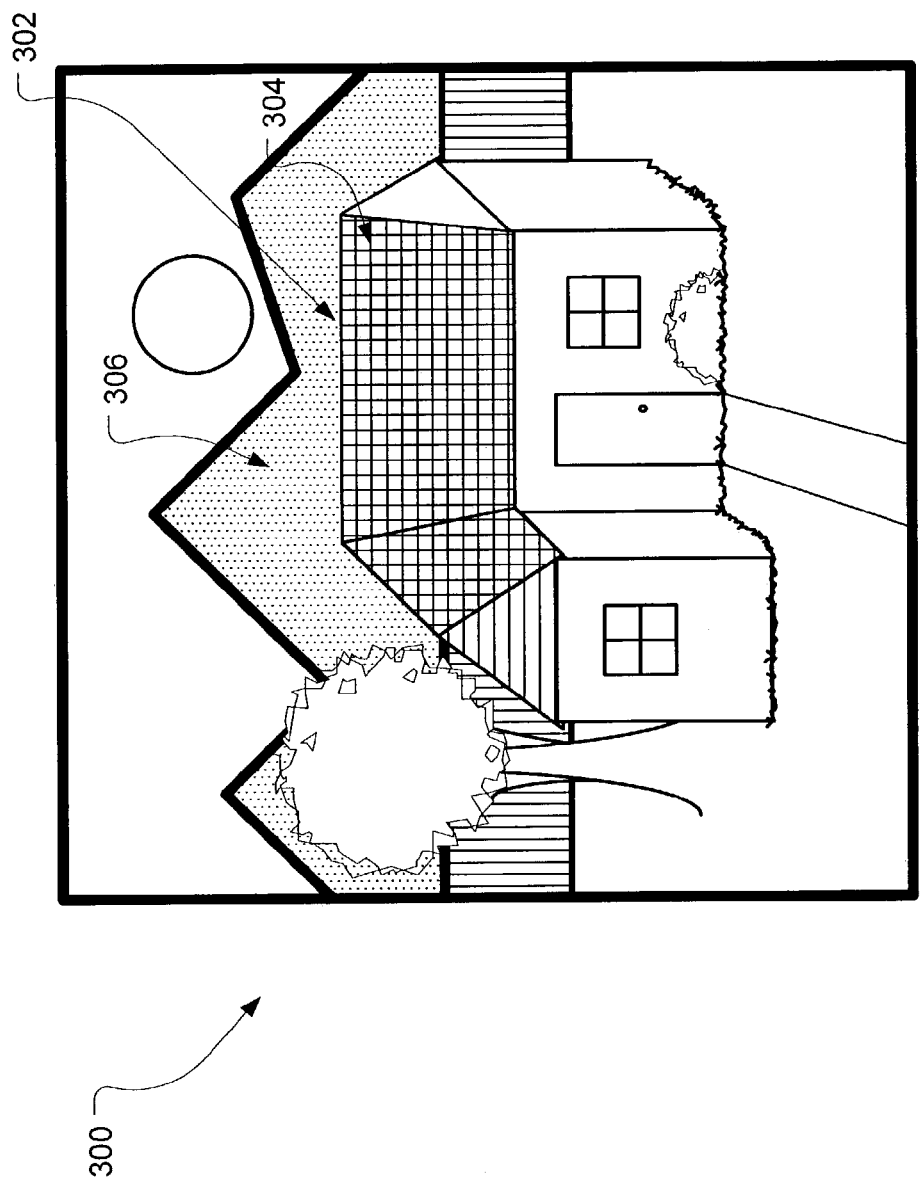
FIG. 3 illustrates an image having a filled destination region in an embodiment of the present invention.

FIG. 3 illustrates an image having a filled destination region in an embodiment of the present invention. The digital image 300 depicts the house without the satellite dish on its roof. In an embodiment of the present invention, to remove the satellite dish from the image, the "delete-and-fill" command deletes the selected region and fills the deleted area with example tiles taken from the proximity of the deleted area, so that example tiles containing image data of the backgrounds 304 and 306 re-create portions of the top of the roof and of the background mountain scenery behind the satellite dish.

Figure 4:
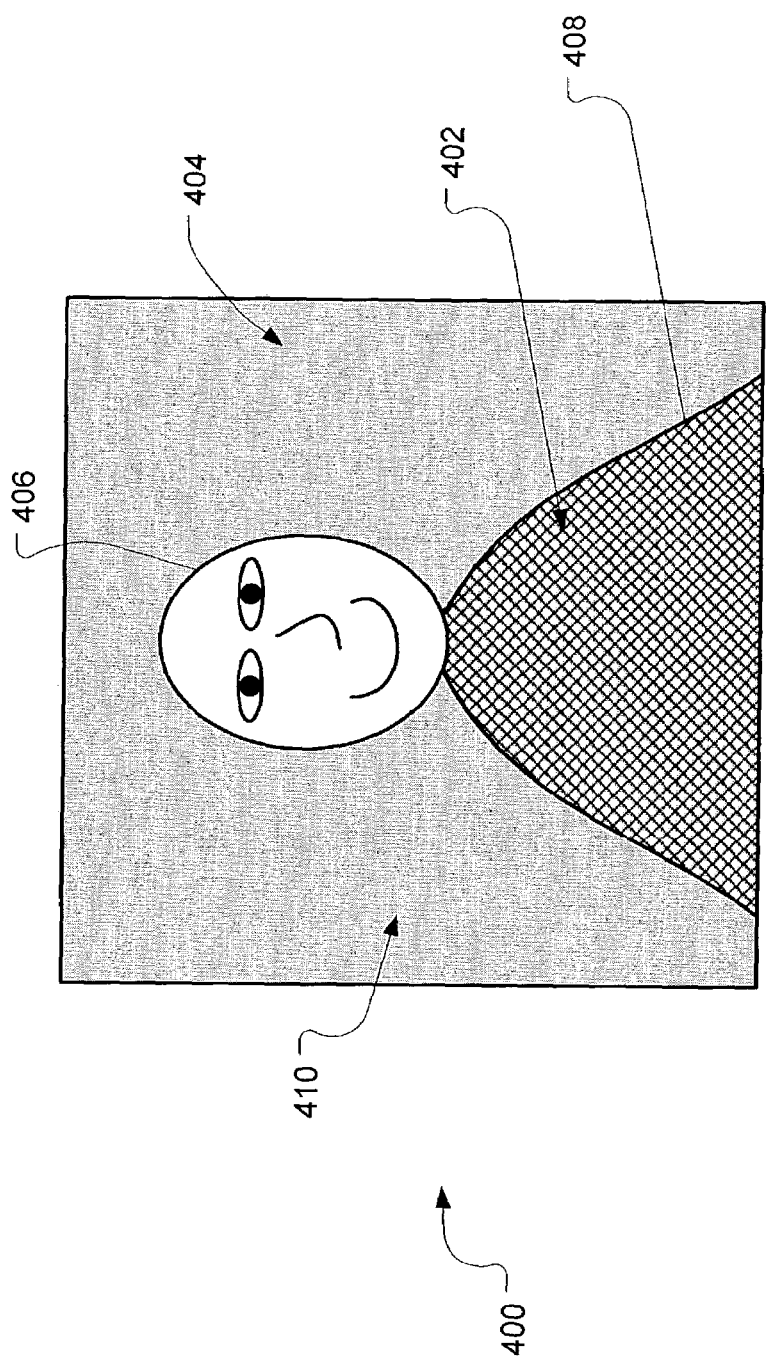
FIG. 4 illustrates another unedited image displayed in an embodiment of the present invention.

FIG. 4 illustrates another unedited image displayed in an embodiment of the present invention. A portrait image 400 shows a happy bald man 410 in a barber's smock 408. However, the user wishes to remove the head 406 of the man 410 in the image 400. To accomplish this, example tiles containing image data of the smock 402 and the background 404 are used to replace tiles in a destination region surrounding the head 406.

Figure 5:
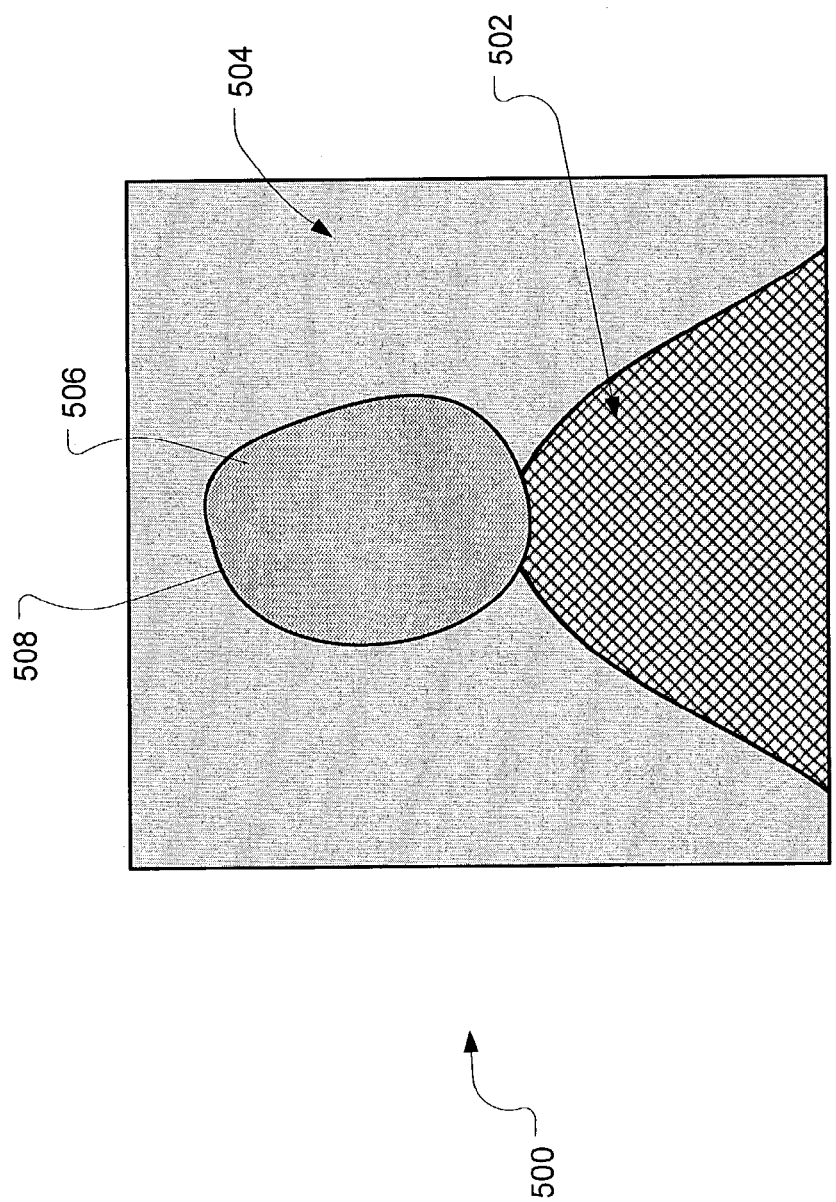
FIG. 5 illustrates a selected destination region in an image displayed in an embodiment of the invention.

FIG. 5 illustrates a selected destination region in an image displayed in an embodiment of the invention. A portrait image 500 shows the happy bald man with a destination region 508 selected around his head 506. The selected region 508 includes image data of both the smock 502 and the background region 504.

Figure 6:
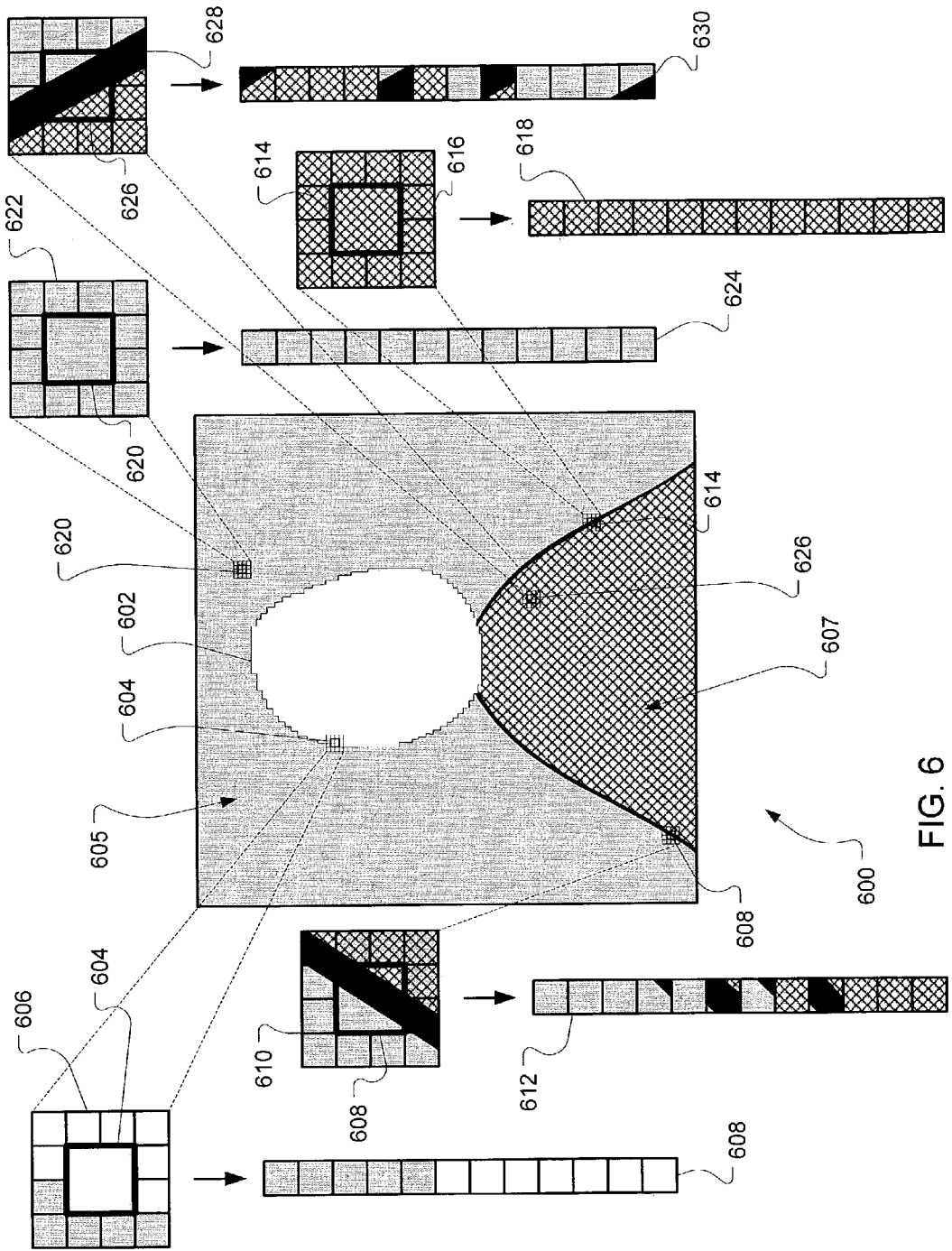
FIG. 6 illustrates a destination tile, multiple example tiles, and neighborhood tiles of each in an embodiment of the present invention.

FIG. 6 illustrates a destination tile, multiple example tiles, and neighborhood tiles of each in an embodiment of the present invention. Generally, tiles are groups of pixels laid out in a grid within the destination region (i.e., such that some portion of each tile is within the destination region). In one embodiment, responsive to execution of the "delete-and-fill" command, the image data corresponding to the destination region 602 is deleted from the image 600. A destination tile 604 is selected with an associated destination neighborhood 606 from the image 600. Each selection of a destination tile selects a tile that has some original material (i.e., original image data) or filled-in material (i.e., replacement image data) in its neighborhood. Alternatively, the tiles in the destination region are not actually deleted, but are replaced by new image data from a dictionary. Both the delete-and-insert operation and the replace operation are considered replacing operations in that the original destination region image data is replaced with new image data.

The destination neighborhood 606 includes five neighborhood elements incorporating image data from the background 605 and seven neighborhood elements corresponding to the destination region 602. It should be understood that the concept of neighborhood elements are discussed merely to assist in describing the Figure and that destination neighborhood elements may include both portions incorporating image data from outside the destination region and portions corresponding to the destination region 602.

In one embodiment, an objective of the "delete-and-fill" command is to identify an example tile (from a source) that provides a close match of the five neighborhood elements incorporating the background 605. The destination neighborhood elements 606 are illustrated in an array 608 to simplify the description of a matching operation below.

Example tiles are taken from a source, which may include without limitation regions of the image in proximity to the destination region 602, other specified regions of the image 600, imported image data, algorithmically-defined image data, etc. In the embodiment illustrated in FIG. 6, the source is defined to include any image data within the image 600 (except the deleted destination region 602).

A dictionary of example tiles is created from the source region of the image 600. Exemplary selections of example tiles 608, 614, 620, and 626 are shown in FIG. 6 in combination with exploded views of each example tile and its neighborhood (608 and 610, 614 and 616, 620 and 622, and 626 and 628) well as an array view of each neighborhood (612, 618, 624, and 630). In an embodiment of the present invention, image data for each example tile is stored in association with an array of image data for its neighborhood. In this manner, an appropriate example tile for filling can be identified by a match between its associated neighborhood and the neighborhood of the destination tile.

To determine which example tile will replace the destination tile 604 in the image 600, the populated neighborhood elements associated with the destination tile 604 (i.e., the first five elements of array 608) are compared with the relevant neighborhood elements of each example tile (i.e., the first of 5 elements of the array). In an embodiment of the present invention, the example tile having relevant neighborhood elements best matching the existing neighborhood elements of the destination tile 604 is selected to replace the destination tile 604 in the image 600. For color images, the pixel values of multiple color channels (e.g., red, green, blue or RGB) are considered in the best match comparison.

A "best match" may be defined in various ways within the scope of the present invention. In one embodiment, a least squared error determination is made between the relevant neighborhood elements of an example tile and the existing neighborhood elements of the destination tile 604.

In one embodiment, a cost function is computed to determine the best matching example tile from the dictionary. The lowest cost example tile is designated as the "best match". An exemplary cost function $\pounds_k(x)$ is given by:

$$\pounds_k(x) = \|x - x_k\|^2,$$

where x represents the image data vector for an existing neighborhood of the destination tile and $x_k$ represents the image data vector for a relevant neighborhood of a candidate example tile k.

In an alternative embodiment, matching rules may be defined to identify a customized "best match". In addition, alternative algorithms are contemplated for defining a "best match" within the scope of the present invention, including without limitation a best match operation involves minimizing or otherwise optimizing any dissimilarity measure, including so called L1 and Lsup distances.

In the illustrated embodiment, the relevant neighborhood elements of example tile 620 provide the best match with the existing neighborhood elements in the destination tile 604. Therefore, the example tile 620 is selected to replace the destination tile 604 in the image 600. The visual effect of this replacement is that the portion of the destination region 602 formerly occupied by destination tile 604 is replaced by example tile 620, which shows the background 605. It should also be understood, that other destination tiles, such as those in the proximity of the man's neck and shoulders, will be replaced by example tiles showing an interface between the background 605 and the smock 607.

The description of FIG. 6 addresses an exemplary embodiment of the present invention. It should be understood, however, that the specific dimensions and shapes of the destination tiles, example tiles, and their respective neighborhoods are not limited to those described with respect to FIG. 6. Moreover, the ordering of the neighborhood elements stored in each array is arbitrary, so long as the ordering is consistent between the destination tile array and the example tile arrays.

Figure 7:
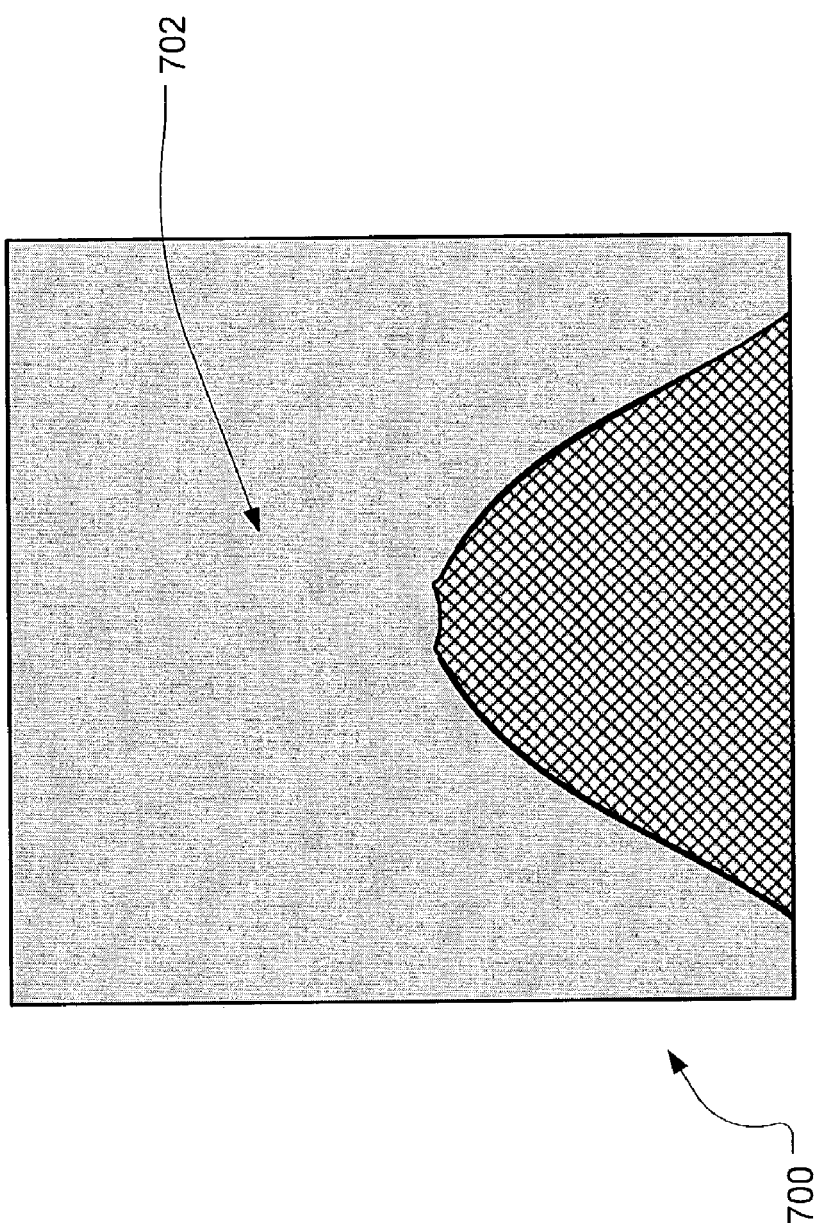
FIG. 7 illustrates an image having a filled destination region in an embodiment of the present invention.

After replacement of a destination tile by an example tile, a new destination tile is selected within the destination region 602 of image 600. Each selection of a destination tile selects a tile that has some original material (i.e., original image data) or filled-in material (i.e., replacement image data) in its neighborhood. In this manner, destination tiles are progressively replaced with matching example tiles until the destination region 602 is filled in. That is, as the destination tiles are replaced (or filled-in), the filled-in image data within the original boundary of the destination region 602 decreases the size of the non-filled-in destination region. FIG. 7 illustrates a filled destination region 702 in the image 700 displayed in an embodiment of the present invention.

Figure 8:
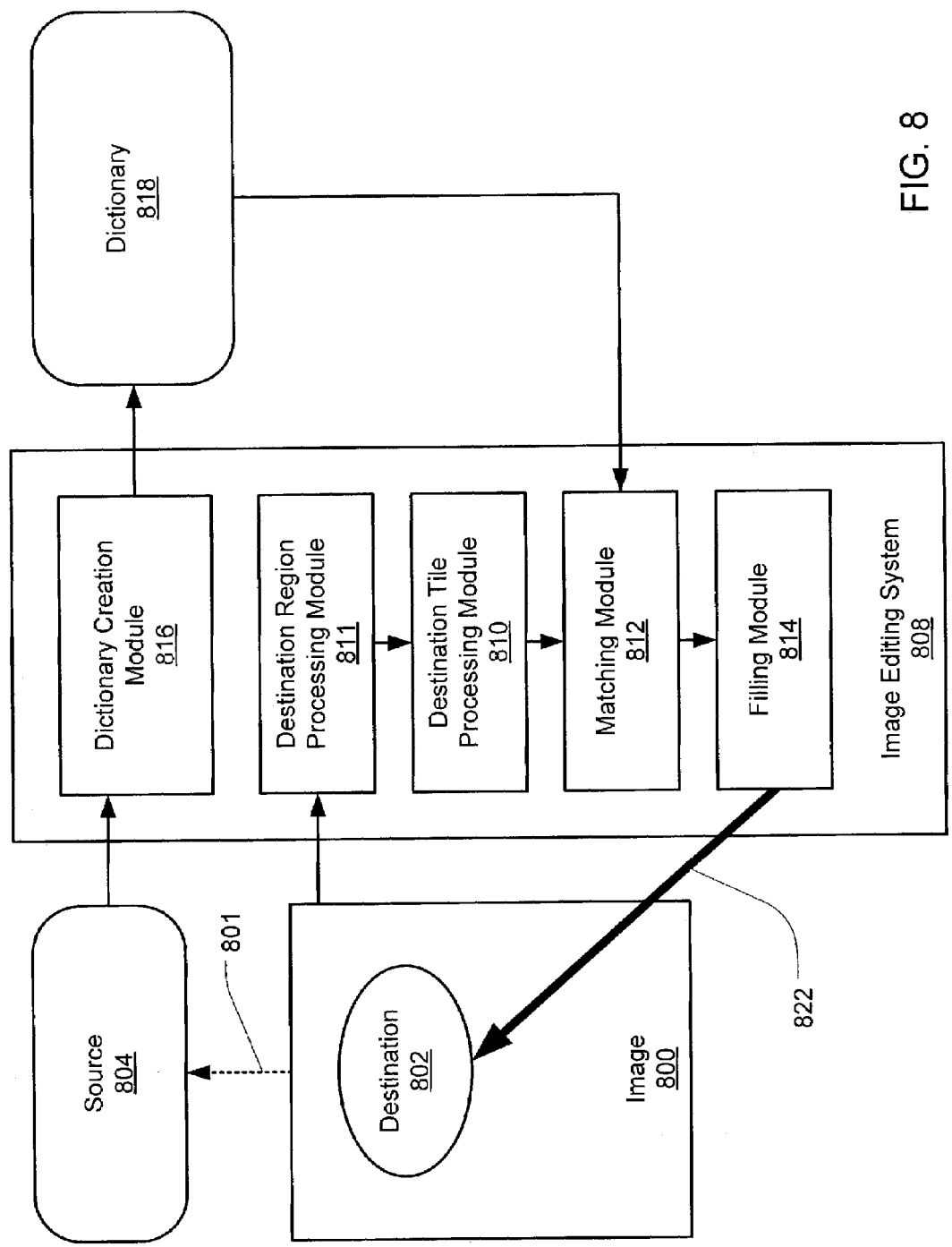
FIG. 8 depicts an image editing system in an embodiment of the present invention.

FIG. 8 depicts an image editing system in an embodiment of the present invention. In one embodiment, the image editing system includes a computer executing image editing software implementing the region filling operations described herein. However, alternative embodiments may include without limitation specialized image editing systems, video editing systems, and print shop editing systems. In addition, the image editing system may include other modules of known image editing programs.

A destination region 802 has been defined in an image 800. It should be understood that images, destination regions, and tiles may be defined in shapes and sizes other than the squares shown in the illustrations, including circles, triangles, and individual pixels. A source 804 may also be defined from within the image 800 (as shown by dotted arrow 801), although source image data may be received from a source outside the image (e.g., imported from other images, defined by a set of rules, etc.).

In the illustrated embodiment, the image data of the destination region is not deleted, but merely replaced with example tiles during a replacement operation. In alternative embodiments, a destination region processing module 811 receives the definition of the destination region, deletes the image data therein, and then inserts new image data into the destination region. At least these two approaches represent examples of a filling operation, although other approaches are also contemplated.

A dictionary creation module 816 generates a dictionary 818 of image data from the source 804. The dictionary includes examples tiles, which are used to replace destination tiles in the destination region 802.

A destination tile processing module 810 receives a definition of the destination region 802 and chooses the destination tiles there from. In one embodiment, the destination tile processing module 810 defines a grid over the destination region 802 and progressively selects individual destination tiles for replacement. Each destination tile selected is associated with a destination neighborhood containing image data from outside the destination tile. Furthermore, in at least one embodiment, each destination tile includes at least a portion of the original image data or the filled-in image data in its neighborhood.

A matching module 812 determines which candidate example tile defined in the dictionary 818 provides the best match with the selected destination tile. A filling module 814 copies the image data of the "best match" example tile to replace the destination tile.

It should be understood that some amount of additional processing may also be performed on the copied image data. For example, for boundary destination tiles, only a portion of the image data from the "best match" example tile may be replaced into the destination tile, thereby maintaining any original image data that had existed in the destination tile outside of the defined destination region (e.g., if the destination tile overlaps the boundary of the selected destination region). In an alternative embodiment, however, all of the image data of the example tile replaces the entire destination tile. The filling operation 814 operates on the destination region 802, as shown by bold arrow 822.

Figure 9:
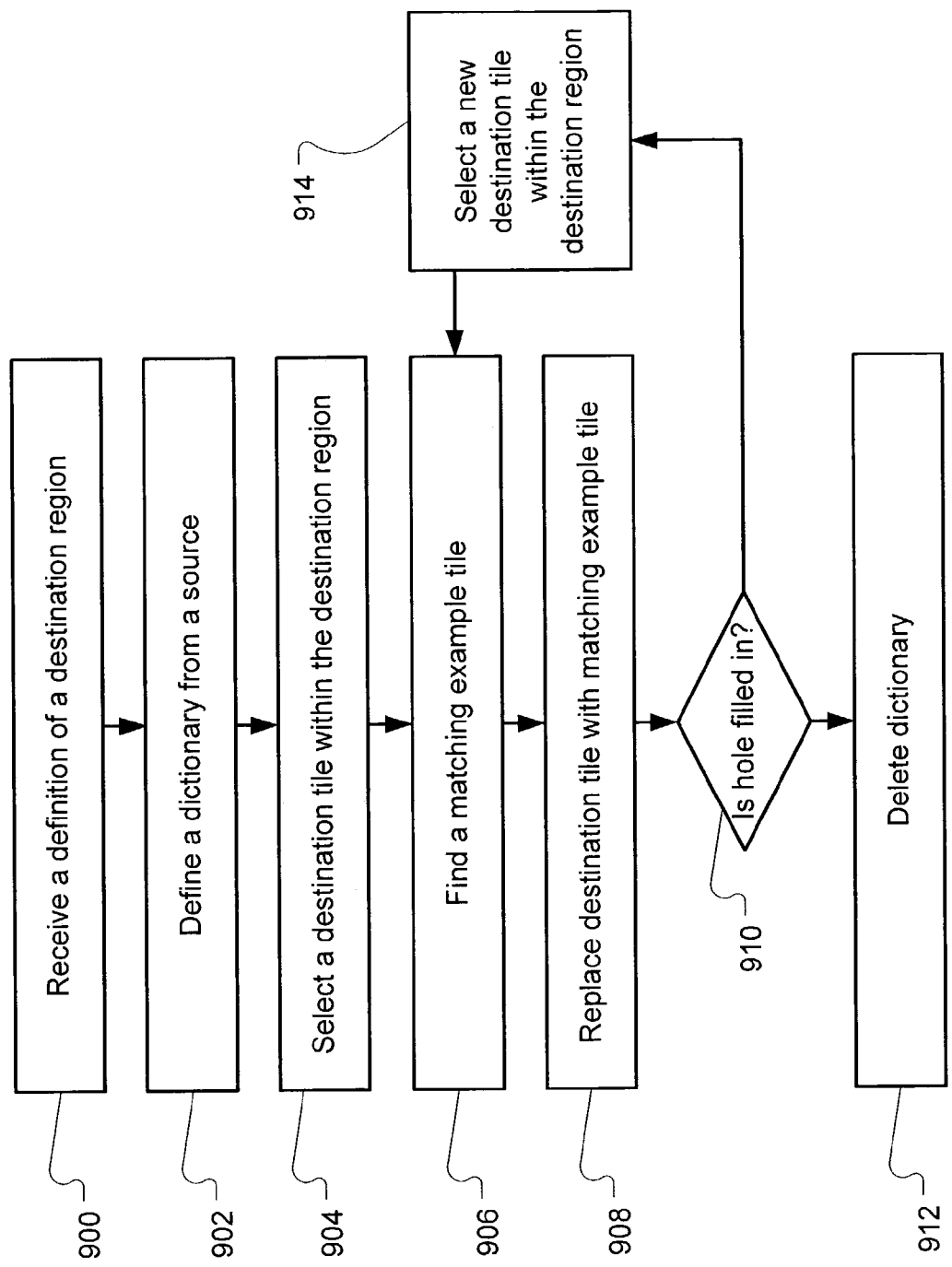
FIG. 9 illustrates operations for filling a destination region in an embodiment of the present invention.

FIG. 9 illustrates operations for filling a destination region in an embodiment of the present invention. A definition of a destination region is received in a receiving operation 900. In one embodiment, a destination region definition may be received by a user selection of an area in the image. The region may be defined as a single graphically selected area (e.g., selected by dragging the mouse cursor along the boundary of the desired destination region), definitions of multiple areas in the image, one or more sets of coordinates, or other location oriented methods. Alternatively, other methods of defining the destination region may include specifying a color to be replaced (e.g., to remove red text that overlays a photograph), specifying a graphics layer in a digital image, using pattern recognition techniques, or using a combination of any of these methods (e.g., specifying a color to be replaced in one or more specified areas of an image).

A defining operation 902 defines a dictionary of image data from a source. A source may be defined in various ways, including without limitation a location oriented method within the image, specification of example tiles from another image, importation of a dictionary from other files, color based methods, layer based methods, or combinations of these or other methods. In one exemplary embodiment, examples tiles are taken from the proximity of the destination region in the image. In another exemplary embodiment, example tiles are taken from a source region within the image, which has been specified by the user.

A selection operation 904 selects a first destination tile from within (or overlapping the boundary of) the destination region. In one embodiment, a grid of uniformly sized tiles is defined over the destination region to identify the set of destination tiles. The first destination tile is selected from this grid, such that the destination tile includes some pixels from the destination region and includes image data from outside the destination region.

A matching operation 906 identifies the example tile from the dictionary that has a neighborhood that best matches the neighborhood of the destination tile. Responsive to the matching operation 906, a replacing operation 908 replaces the destination tile in the destination region with the matching example tile from the dictionary. In one embodiment, the image data of the example tile is copied into the location defined by the destination tile. For some destination tiles, particularly those on the boundary of the original destination region, some original material that is strictly outside the originally defined destination region may be replaced in this operation. Alternatively, additional processing of the example tile prior to replacement may prevent the overwriting of such original material. Optimization of the size and positioning of the destination tiles within the destination region can influence the amount of original material replaced in the replacing operation 908.

A decision operation 910 determines if any additional destination tiles exist in the destination region that require filling. If so, a selection operation 914 selects a new destination tile from within the destination region. In one embodiment, the progressive selection of new destination tiles proceeds along the boundary of the destination region. As each destination tile is replaced, the destination region gets smaller. Each selection of a destination tile selects a tile that has some original material (i.e., original image data) or filled-in material (i.e., replacement image data) in its neighborhood. This progressive selection and filling of new destination tiles continues until the destination region is filled. If the decision operation 910 determines that the entire destination region has been filled, a deleting operation 912 deletes the dictionary.

It should be understood that, while the dictionary is employed as a convenient persistent data structure in an exemplary implementation, alternative implementations are contemplated. For example, in one implementation, the source region is completely or partially searched for each destination tile.

FIG. 10 depicts a digital image 1004 and an associated dictionary 1006 of image data in an embodiment of the present invention. A destination region 1002 is defined in the image 1004. The associated dictionary 1006 includes image data from example tiles and associated example neighborhoods within the designated source 1000. The source 1000 may be defined by user selection, by a predefined rule (e.g., as a rectangular region surrounding the destination region 1002 by at least X pixels), or by other means. In the illustrated embodiment, the source 1000 is defined by a user selection or by a region in proximity around the destination region 1002. For the purpose of this description, the image data in the dictionary 1006 is illustrated in vertical arrays across the width of the dictionary 1006.

Figure 11:
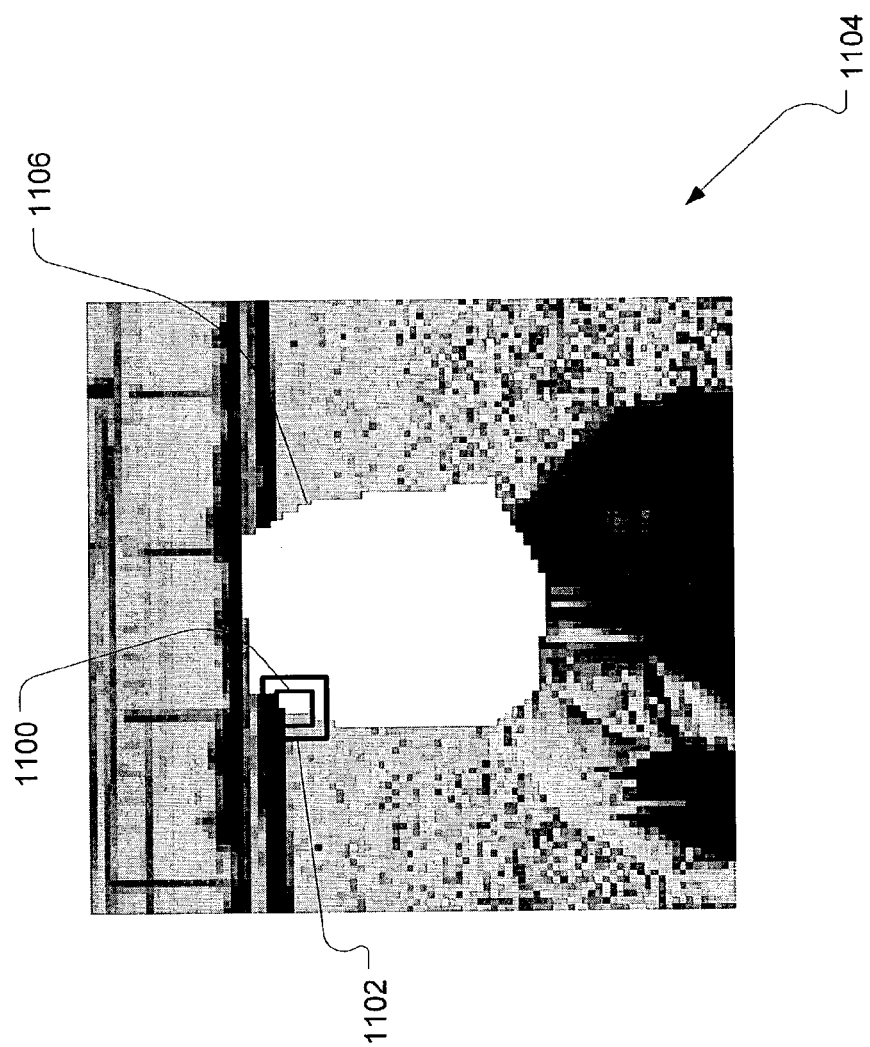
FIG. 11 depicts a destination tile and an associated neighborhood in an embodiment of the present invention.

FIG. 11 depicts a destination tile 1100 and an associated destination neighborhood 1102 in an embodiment of the present invention. The initial choice of the destination tile 1100 includes at least a portion of the destination region 1106 (e.g., the deleted destination region) in the destination tile 1100 and at least a portion of the original image data of the image 1104 in the neighborhood 1102 of the destination tile 1100. In this manner, the selected example tiles used to replace the destination tiles provide a blended, realistic solution across the destination region.

In an embodiment, the destination tile 1100 is chosen by defining a grid over the destination region 1106. The grid elements are defined to be the size of the destination tile. It should be understood that the size and shape of the grid elements and the destination tiles, as well as the relative position of the grid to the destination region 1106, may be varied to optimize the desired granularity of the filling operation, the smoothness of seams, the speed of computation, and the amount of original material that is replaced by the example tiles. However, in most cases, acceptable results can be achieved without any specific tuning of these parameters.

In another embodiment, individual destination tiles and the candidate example tiles can be jointly varied in size to optimize results. For example, destination tiles around the boundary of the original destination region and the associated dictionary tiles may be smaller to maintain the most original material from the original image around the boundary. Thereafter, farther way from the boundary, larger destination tiles, and therefore larger associated dictionary tiles may be used to minimize computational needs.

Figure 12:
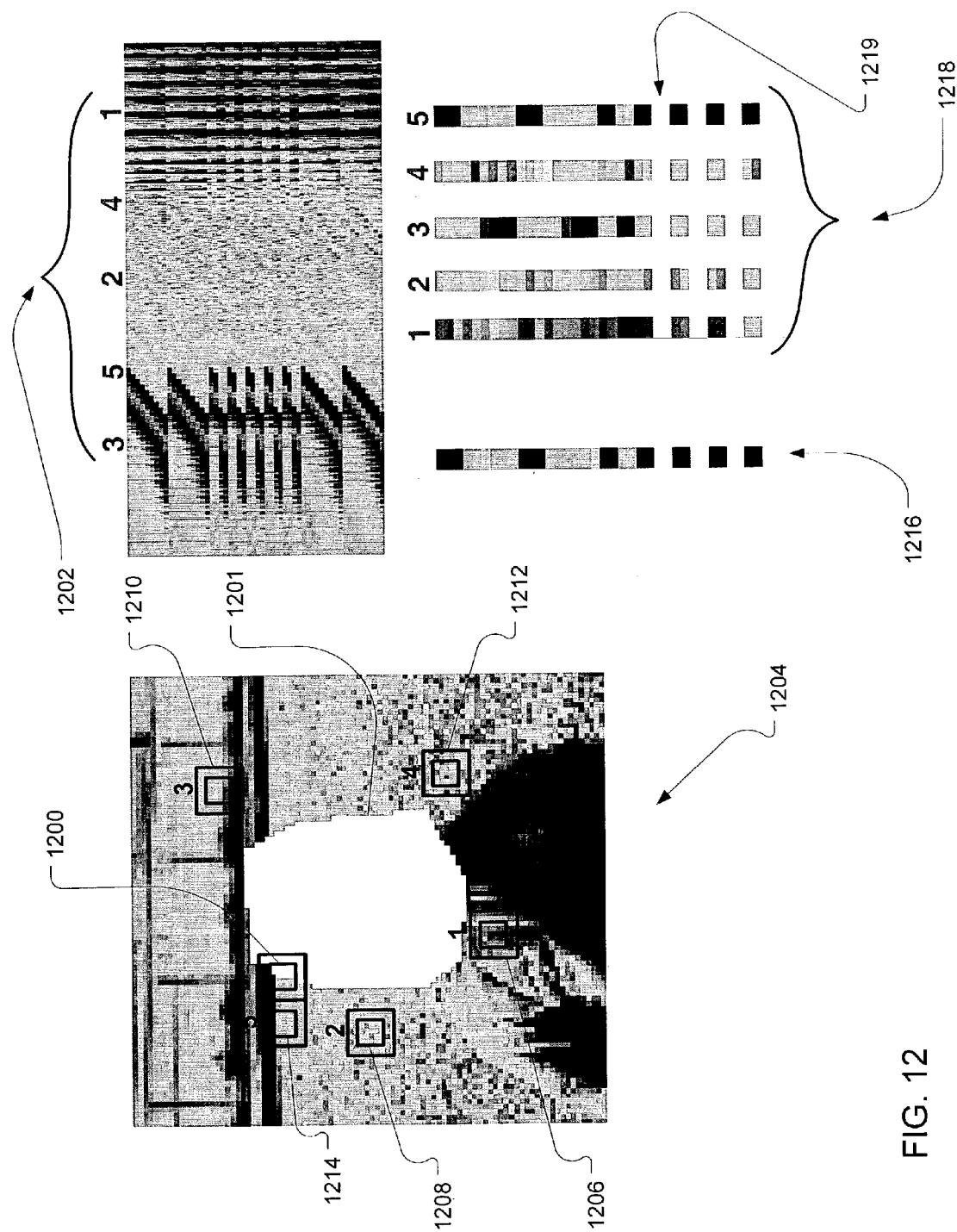
FIG. 12 depicts candidate dictionary tiles and associated neighborhoods in an embodiment of the present invention.

FIG. 12 depicts various candidate example tiles 1206, 1208, 1210, 1212, and 1214, and associated neighborhoods in an embodiment of the present invention. The image data in the neighborhood of the destination tile 1200 is shown at 1216. The image data in the neighborhood of the candidate example tiles are shown in 1218: Numbered column "1" corresponds to candidate example tile 1206, column "2" to tile 1208, column "3" to tile 1210, column "4" to tile 1212, and column "5" to tile 1214. Likewise, the numbered columns 1202 in the dictionary 1203 correspond to the image data of neighborhoods of all candidate tiles in the source.

Alternative sources of candidate tiles are also contemplated, including less persistent dictionaries dynamically and destroyed for each tile or individual sets of tiles, and dictionaries includes additional information to augment the neighborhood image data (e.g., including the image data of the candidate tile or other annotations data).

In the illustrated embodiment, the columns 1218 show portion of the neighborhood image data is omitted (see, for example, the gap 1219 in the image data for column "5"). These omissions in the candidate example tile arrays correspond to image data in the neighborhood of the destination tile 1200 that are located within the destination region 1201 or have not yet been filled in. The image data of these omitted portions is not considered in the matching operation used to determine the best match example tile.

Figure 13:
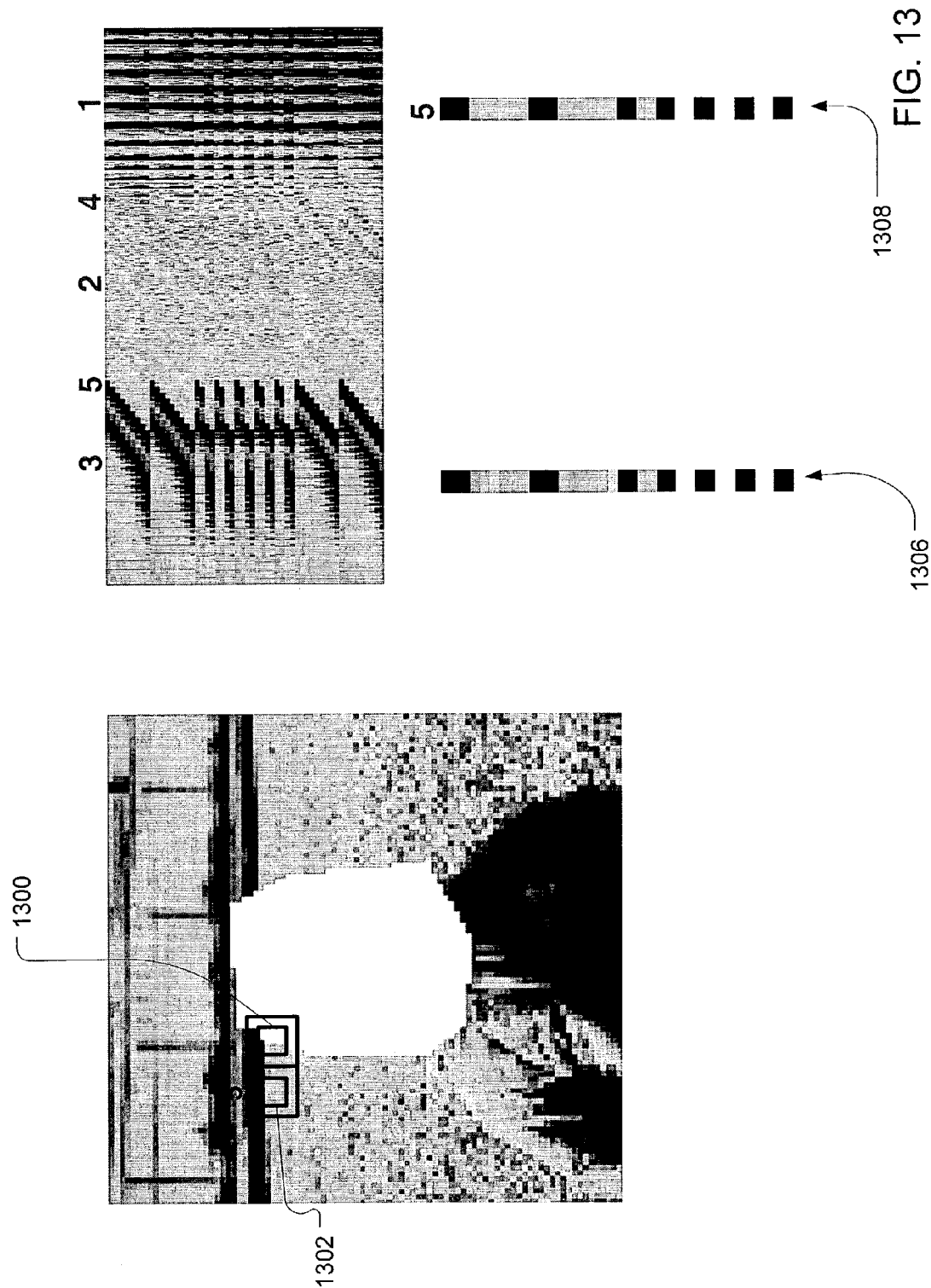
FIG. 13 depicts a matching dictionary tile and an associated neighborhood in an embodiment of the present invention.

FIG. 13 depicts a matching dictionary tiles and an associated neighborhood in an embodiment of the present invention. The matching operation has determined that the relevant neighborhood data of the candidate example tile 1302 provides the best match to the existing neighborhood data of the destination tile 1300. The similarities between the neighborhoods can be seen by a comparison between the arrays 1306 and 1308.

Figure 14:
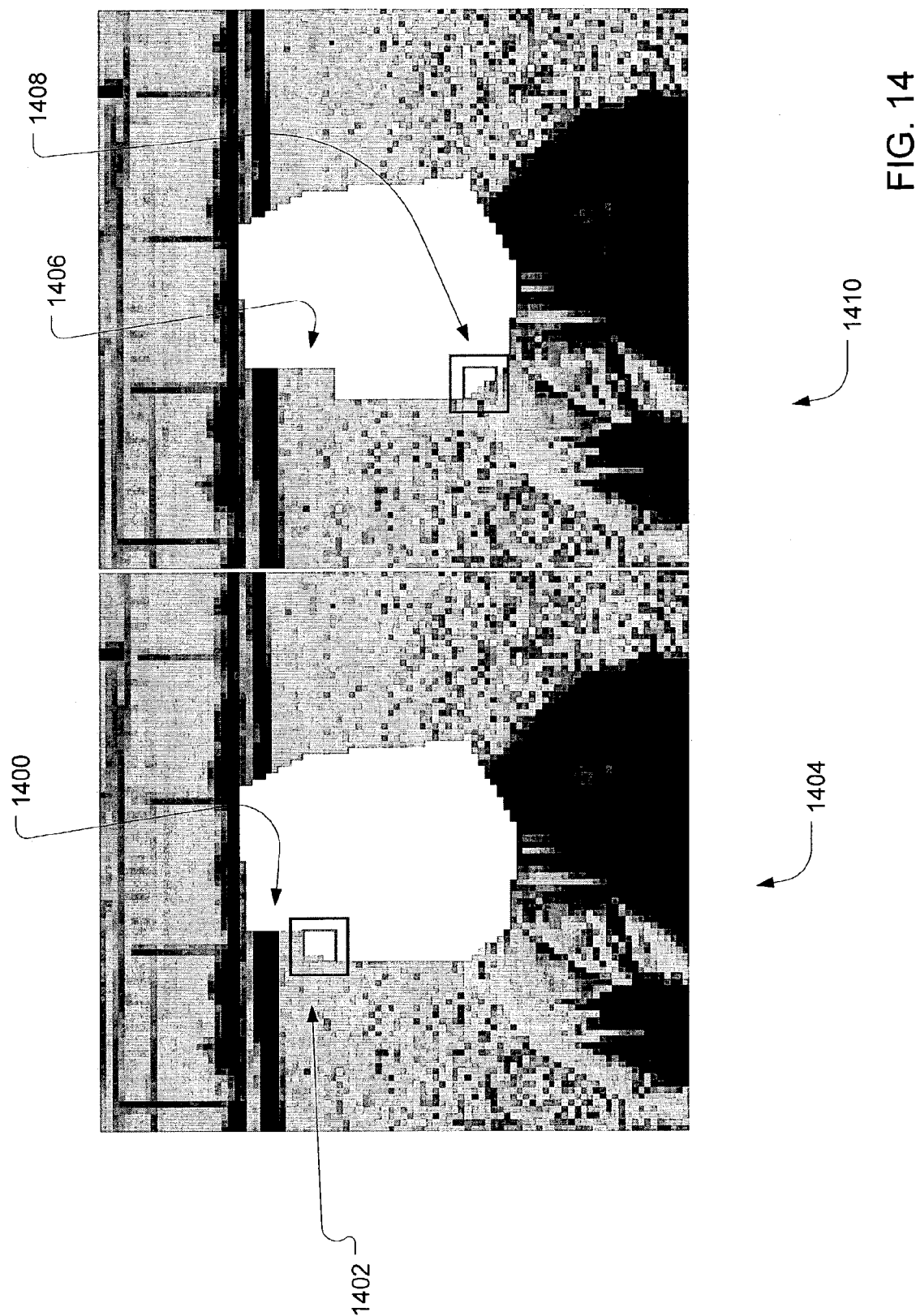
FIG. 14 depicts a sequence of two images having filled-in destination tiles in an embodiment of the present invention.

FIG. 14 depicts a sequence of two images having filled-in destination tiles in an embodiment of the present invention. In image 1404, a destination tile 1400 has been replaced with image data of a matching example tile. A next destination tile 1402 has been selected for filling. In image 1406, the destination tile 1406 (shown as tile 1402 in image 1404) has been filled, and a next destination tile 1408 has been selected for filling. This filling process proceeds progressively from the boundary of the destination region until the entire destination region has been filled. As the destination tiles are filled in, the destination region gets smaller. Subsequent selections of destination tiles will have neighborhoods that include image data are from the original background or from previously filled-in destination tiles.

Figure 15:
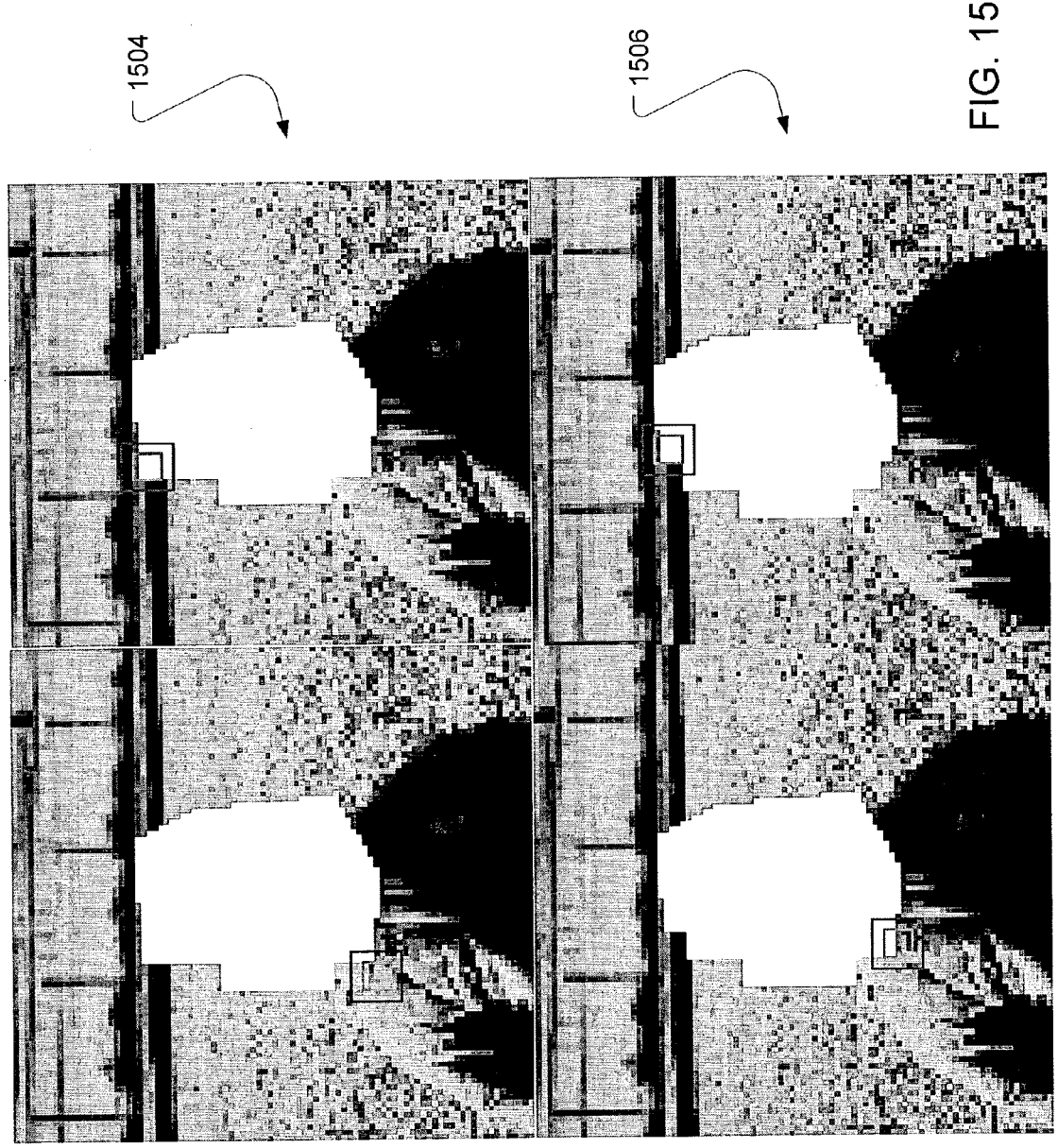
FIG. 15 depicts a sequence of four images having filled-in destination tiles in an embodiment the present invention.

FIG. 15 depicts a sequence of four images having filled-in destination tiles in an embodiment the present invention. Images 1500, 1502, 1504, and 1506 show progressive filling of destination tiles based on the process described herein.

Figure 16:
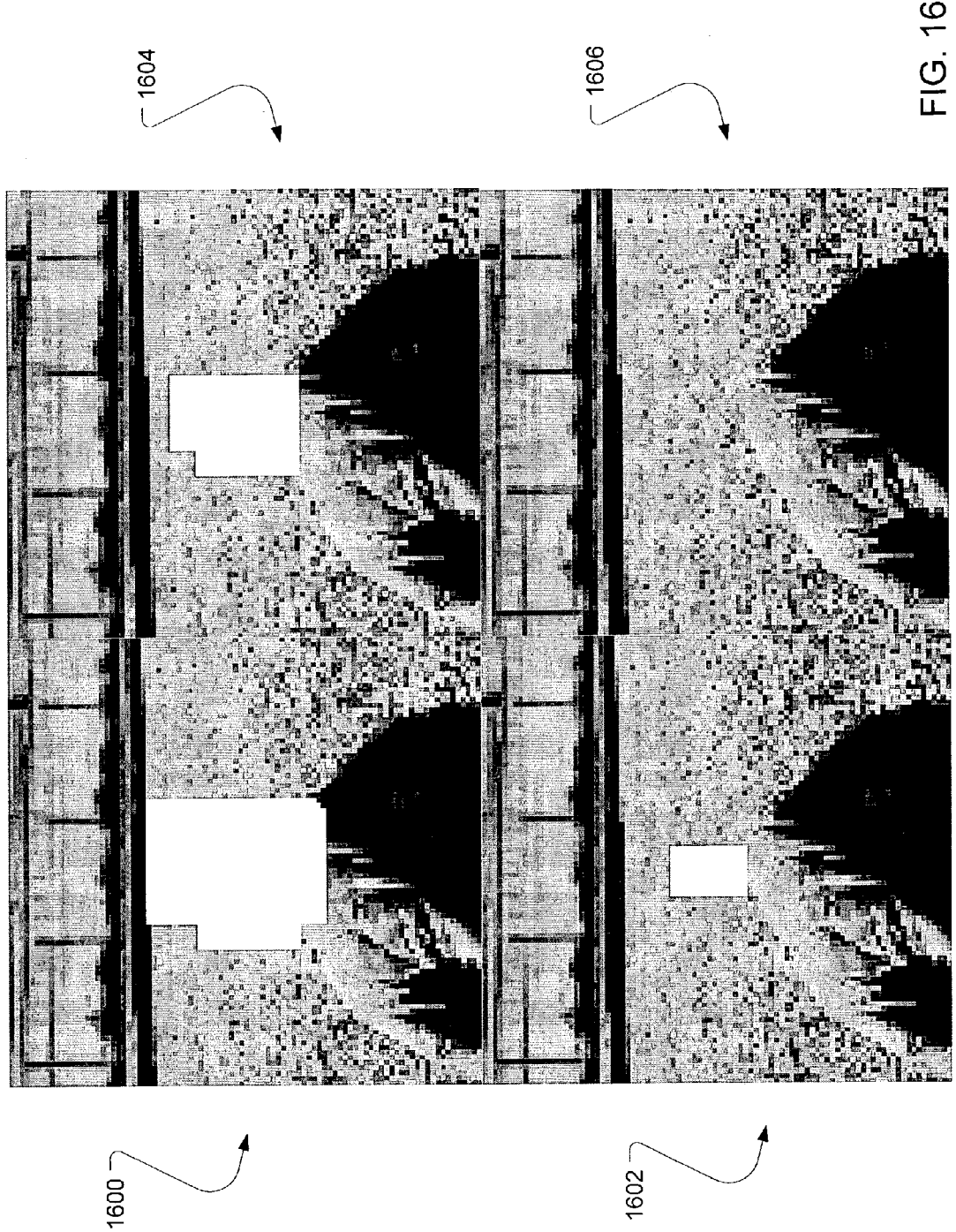
FIG. 16 depicts another sequence of four images having filled-in destination tiles in an embodiment the present invention.

FIG. 16 depicts another sequence of four images having filled-in destination tiles in an embodiment the present invention. Images 1600, 1602, 1604, and 1606 show progressive filling of destination tiles based on the process described herein. In image 1606, the destination region has been completely filled in.

Figure 17:
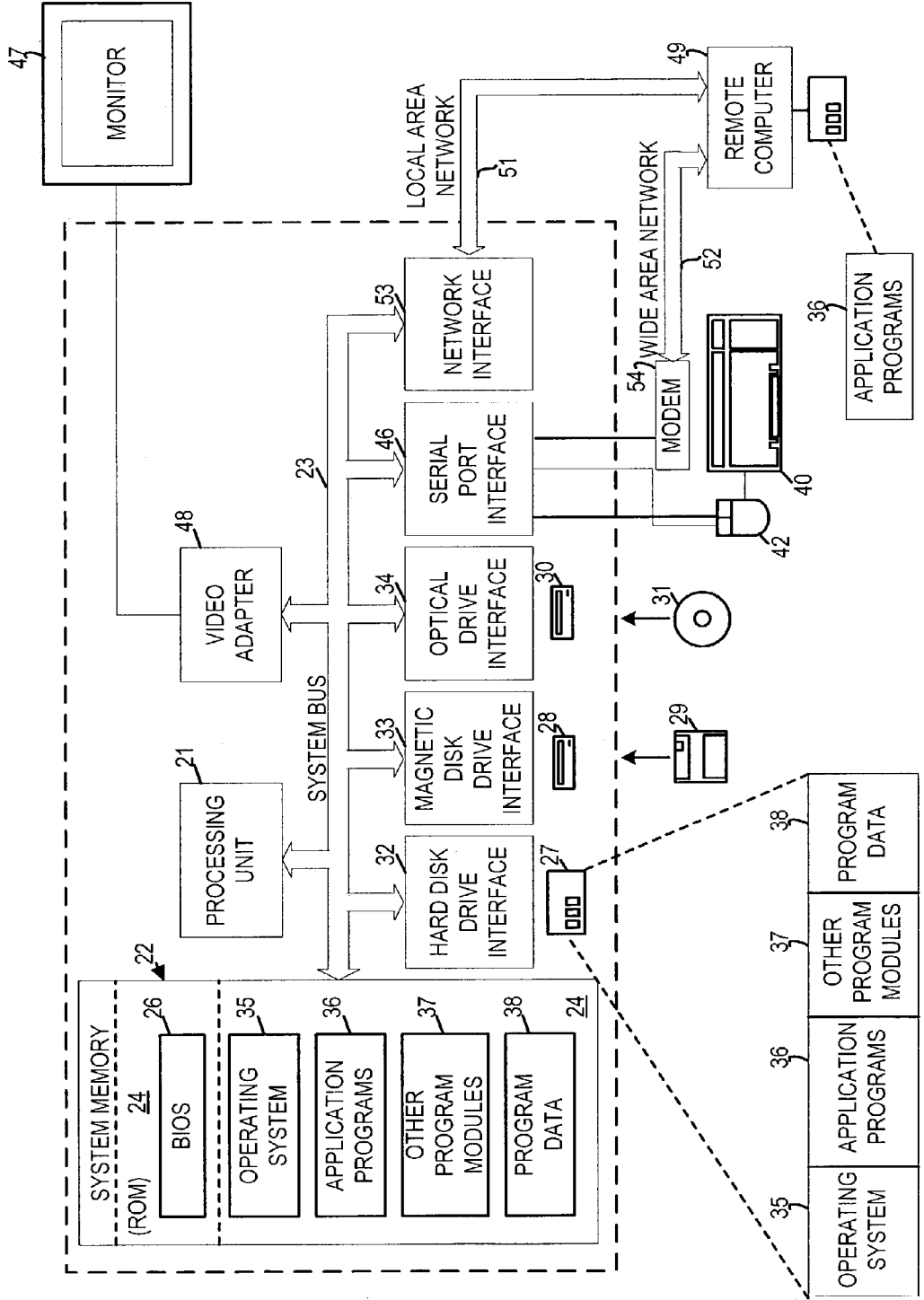
FIG. 17 illustrates an exemplary system useful for implementing an embodiment of the present invention.

The exemplary hardware and operating environment of FIG. 17 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 17. The logical connections depicted in FIG. 17 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an embodiment of the present invention, a dictionary creation module, a destination region processing module, a destination tile processing module, a matching module, and a filling module may be incorporated as part of the operating system 35, application programs 36, or other program modules 37. The dictionary and other image data may be stored as program data 38.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method of filling a destination region in an image with one or more example tiles, the method comprising;
   defining a grid of destination tiles over the destination region;
   selecting a destination tile within the destination region, the destination tile being associated with a destination neighborhood containing at least one of original image data from outside the destination region and filled-in image data;
   selecting a matching example tile from a plurality of example tiles, each example tile being associated with an example neighborhood, the matching example tile providing a best match between the example neighborhood of the matching example tile and the destination neighborhood of the destination tile; and
   replacing the destination tile in the image with the matching example tile.

2. The method of claim 1 further comprising:
   receiving a destination selection associated with the image to define the destination region.

3. The method of claim 1 further comprising:
   generating a dictionary associated with the plurality of example tiles, the dictionary including the example neighborhood of each example tile.

4. The method of claim 3 wherein the one or more example tiles are derived from image data from a portion of the image.

5. The method of claim 3 wherein the one or more example tiles are derived from image data from a specified region of the image.

6. The method of claim 3 wherein the one or more example tiles are derived from image data from a region of the image in proximity of the destination region.

7. The method of claim 3 wherein the one or more example tiles are derived from imported image data.

8. The method of claim 1 wherein the operation of selecting a destination tile within the destination region comprises:
   selecting the destination tile to contain at least a portion of original image data in the destination neighborhood of the destination tile.

9. The method of claim 1 wherein the operation of selecting a destination tile within the destination region comprises:
   selecting the destination tile to contain at least a portion of replacement image data in the destination neighborhood of the destination tile.

10. The method of claim 1 further comprising:
    progressively selecting one or more additional destination tiles from the destination region for replacement by one or more corresponding example tiles.

11. The method of claim 1 further comprising:
    replacing each one or more additional destination tiles with each of the one or more corresponding example tiles until the destination region is filled.

12. A computer program product encoding a computer program for executing on a computer system a computer process for filling a destination region in an image with one or more example tiles, the computer process comprising:
    defining a plurality of grid elements over the destination region;
    selecting a destination tile within the destination region corresponding to a grid element, the destination tile being associated with a destination neighborhood containing at least one of original image data from outside the destination region and filled-in image data;
    selecting a matching example tile from a plurality of example tiles, each example tile being associated with an example neighborhood, the matching example tile providing a best match between the example neighborhood of the matching example tile and the destination neighborhood of the destination tile; and
    replacing the destination tile in the image with the matching example tile.

13. The computer program product of claim 12 wherein the computer process further comprises:
    receiving a destination selection associated with the image to define the destination region.

14. The computer program product of claim 12 wherein the computer process further comprises:
   generating a dictionary associated with the plurality of example tiles, the dictionary including the example neighborhood of each example tile.

15. The computer program product of claim 14 wherein the one or more example tiles are derived from image data from a portion of the image.

16. The computer program product of claim 14 wherein the one or more example tiles are derived from image data from a specified region of the image.

17. The computer program product of claim 14 wherein the one or more example tiles are derived from image data from a region of the image in proximity of the destination region.

18. The computer program product of claim 14 wherein the one or more example tiles are derived from imported image data.

19. The computer program product of claim 12 wherein the operation of selecting a destination tile within the destination region comprises:
   selecting the destination tile to contain at least a portion of original image data in the destination neighborhood of the destination tile.

20. The computer program product of claim 12 wherein the operation of selecting a destination tile within the destination region comprises:
   selecting the destination tile to contain at least a portion of replacement image data in the destination neighborhood of the destination tile.

21. The computer program product of claim 12 wherein the computer process further comprises:
   progressively selecting one or more additional destination tiles from the destination region for replacement by one or more corresponding example tiles.

22. The computer program product of claim 12 wherein the computer process further comprises:
   replacing each one or more additional destination tiles with each of the one or more corresponding example tiles until the destination region is filled.

23. A system for filling a destination region in an image with one or more example tiles, the system comprising:
   a destination tile processing module selecting a destination tile within the destination region, the destination tile being associated with a destination neighborhood containing at least one of original image data from outside the destination region and filled-in image data;
   defining a source image based on at least one of a specified color or a specified graphics layer;
   a matching module selecting a matching example tile from a plurality of example tiles each example tile being associated with an example neighborhood, the matching example tile providing a best match between the example neighborhood of the matching example tile and the destination neighborhood of the destination tile; and
   a filling module replacing the destination tile in the image with the matching example tile.

24. The system of claim 23 further comprising:
   a destination region processing module receiving a destination selection associated with the image to define the destination region.

25. The system of claim 23 further comprising:
   a dictionary creation module generating a dictionary associated with the plurality of example tiles, the dictionary including the example neighborhood of each example tile.

26. The system of claim 25 wherein the one or more example tiles are derived from image data from a portion of the image.

27. The system of claim 25 wherein the one or more example tiles are derived from image data from a specified region of the image.

28. The system of claim 25 wherein the one or more example tiles are derived from image data from a region of the image in proximity of the destination region.

29. The system of claim 25 wherein the one or more example tiles are derived from an image data source providing imported image data.

30. The system of claim 23 wherein the destination tile processing module selects the destination tile to contain at least a portion of original image data in the destination neighborhood of the destination tile.

31. The system of claim 23 wherein the destination tile processing module selects the destination tile to contain at least a portion of replacement image data in the destination neighborhood of the destination tile.

32. The system of claim 23 wherein the destination tile processing module progressively selects one or more additional destination tiles from the destination region for replacement by one or more corresponding example tiles.

33. The system of claim 23 the filling module replaces each one or more additional destination tiles with each of the one or more corresponding example tiles until the destination region is filled.

34. A method of filling a destination region in an image with one or more example tiles, the method comprising:
   defining the destination region using pattern recognition;
   selecting a destination tile within the destination region, the destination tile being associated with a destination neighborhood containing at least one of original image data from outside the destination region and filled-in image data;
   replacing the destination tile in the image with a best matching example tile; and
   repeating the defining selecting and replacing operations until the destination region is filled.

35. A computer program product encoding a computer program for executing on a computer system a computer process for filling a destination region in an image with one or more example tiles, the computer process comprising:
   defining the destination region based on at least one of a specified color or a specified graphics layer in the image;
   selecting a destination tile within the destination region, the destination tile being associated with a destination neighborhood containing at least one of original image data from outside the destination region and filled-in image data;
   replacing the destination tile in the image with a best matching example tile; and repeating the selecting and replacing operations until the destination region is filled.

* * * * *